United States Patent [19]

Prescott et al.

[11] Patent Number: 4,810,578

[45] Date of Patent: Mar. 7, 1989

[54] SURFACE MODIFIED PIGMENTS AND METHODS FOR PRODUCING SAME AND ELASTOMERS CONTAINING SAME

[75] Inventors: Paul I. Prescott, Lilburn; C. Arlyn Rice, Sandersville, both of Ga.

[73] Assignee: E.C.C. America Inc., Atlanta, Ga.

[21] Appl. No.: 99,316

[22] Filed: Sep. 25, 1987

Related U.S. Application Data

[63] Continuation-in-part of Ser. No. 921,141, Oct. 20, 1986, abandoned.

[51] Int. Cl.[4] ............................................. B32B 5/16
[52] U.S. Cl. ..................................... 428/405; 106/487
[58] Field of Search ................... 428/405; 106/308 Q

[56] References Cited

U.S. PATENT DOCUMENTS

| | | | |
|---|---|---|---|
| 3,364,059 | 1/1968 | Marzocchi | 428/391 |
| 3,567,680 | 3/1971 | Iannicelli | 524/574 |
| 4,143,027 | 3/1979 | Sollman et al. | 428/405 |
| 4,514,231 | 4/1985 | Kerner et al. | 106/309 |

OTHER PUBLICATIONS

Dynamit Nobel Brochure.
Chemical Abstracts, vol. 94, No. 4, Jan. 26, 1981, p. 59, Abstract No. 16901w, Columbus, Ohio, U.S. SP-A-482 033 (Tolsa S.A.) 01-04-1980.

*Primary Examiner*—Joseph L. Schofer
*Assistant Examiner*—J. M. Reddick
*Attorney, Agent, or Firm*—Stefan J. Klauber

[57] ABSTRACT

The surface of a hydrous clay such as kaolin is modified by treatment with an alkyl dimethoxy mercaptopropylsilane and the modified clay is used as a filler in elastomers to give improved reinforcement.

5 Claims, No Drawings

SURFACE MODIFIED PIGMENTS AND METHODS FOR PRODUCING SAME AND ELASTOMERS CONTAINING SAME

This application is a continuation-in-part of U.S. Ser. No. 921,141 filed Oct. 20, 1986, now abandoned.

FIELD OF THE INVENTION

This invention relates to inorganic pigments and more especially to modifications of inorganic pigments, e.g., clays. In particular, the present invention relates to the modification of finely divided particulate clays such as kaolin clays by treatment with mercaptopropylsilanes to improve their usefulness as reinforcing fillers in rubber.

BACKGROUND OF INVENTION

It is known from U.S. Pat. No. 3,567,680 to Joseph Iannicelli, assigned to J. M. Huber Corporation, issued Mar. 2, 1971, that mercaptopropyl silanes having the formula:

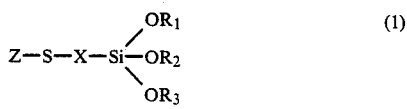

wherein Z is selected from the group consisting of hydrogen, cation, alkyl, aryl, alkylaryl, arylalkyl and derivatives thereof; X is selected from the group consisting of alkyl, alkylaryl, and arylalkyl; and R$_1$, and R$_2$, and R$_3$ are selected from the group consisting of hydrogen, cation and alkyl, are suitable for modifying kaolin clays to enable them to be used as reinforcing fillers for elastomers. In fact the thus modified clays have been the candidates of choice for such fillers in commerce. It may be noted that in the Iannicelli disclosure, only the trialkoxy mercaptopropyl silanes are considered.

In U.S. Pat. No. 3,364,059 to Marzocchi, a method for treating glass fibers to improve their bonding relationship to rubbers comprises treating them with a silane which has from 1–3 highly hydrolyzable groups and an organic group attached to the silicon atom containing a thio group, as represented by the formula R$_n$SiX$_{(4-n)}$ wherein X is a highly hydrolyzable group such as chlorine, bromine, iodine or other halogen; methoxy, ethoxy, propoxy or the like short-chained alkoxy group.

In Sollman et al, U.S. Pat. No. 4,143,027, mercaptosilane powder mixtures are described having superior shelf life and which are added during compounding of rubbers to provide a desirable amount of the silane therein. The object is to absorb a silane on a powder and achieve good storage stability. Example 1 shows a rubber composition comprising a hydrous clay-filled polyisoprene, various additives and the silane powder mixture, the silane compounds described being the trimethoxy, -ethoxy and -n-propoxy mercaptopropyl silanes of which the latter two are stated to exhibit far greater stability in storage than the methoxy compounds.

SUMMARY OF THE INVENTION

It has now been found, unexpectedly, that a different structure of mercaptopropyl silanes is more desirable as a modifier of clays, producing more effective reinforcing fillers for elastomers, plastics and the like. Unexpected improvements in the resultant rubber products are in tear resistance and better stock-to-stock adhesion.

According to the invention, these silanes are represented by the formula:

where R is alkyl, R' is (CH$_2$)$_3$(propyl), X is —SH and R" may be alkyl, preferably lower alkyl or an aryl group such as methyl, ethyl or phenyl.

Silanes of this type are commercially available as Dynasylan 3403, as advertised in a brochure of Dynamit Nobel, Kay-Fries Chemical Division entitled "Dynasylan Organo Functional Silanes/Coupling Agents."

The clay utilized as starting material may be any hydrous clay, e.g., one that has not been calcined, i.e., dehydroxylated, since the hydroxyl groups are needed in the treatment with the above-described silane. With regard to terminology, it may be noted that although the term "hydrous" is commonly used, strictly speaking there is no molecular water actually present in the kaolinite structure as it is now well known that kaolinite is an aluminum hydroxide silicate of approximate composition Al$_2$(OH)$_4$Si$_2$O$_5$. Commercially available clays useful for the present purpose include kaolins such as Alphaplate®, which is a delaminated kaolin, having 80% by weight of its particles below 2 micrometers; Alphagloss® (94–96% less than 2 micrometers); and Betagloss® (94–96% less than 2 micrometers). These and other suitable kaolins are available from the Anglo-American Clays subsidiary of E.C.C. America, Inc. of Atlanta, Ga.

It is believed that the improvement in the clays modified by the silanes according to the invention, as reinforcing fillers for rubber, may arise from a change in their sterochemistry and/or in hydrophobicity.

Accordingly the invention comprises a finely divided particulate reinforcing filler pigment for elastomers—and the resultant reinforced elastomers—comprising a hydrous clay, the surface of which has been modified by treatment with a mercaptosilane having the formula:

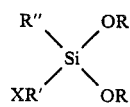

wherein R is alkyl, R' is (CH$_2$)$_3$, X is SH and R" is alkyl or aryl.

Further, the invention comprises a process for preparing a finely divided particulate reinforcing filler pigment for use in elastomers comprising a hydrous clay, the surface of which has been modified by treatment with a mercaptosilane comprising: preparing a dispersed aqueous clay slurry; adding to said slurry from about 0.2 to about 0.7% based on the weight of the dry clay, of a mercaptosilane having the formula:

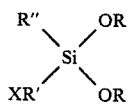

wherein R is alkyl, preferably a lower alkyl, e.g., $C_1$ to $C_4$, R' is $(CH_2)_3$, X is SH and R" is alkyl or aryl; and spray drying said slurry to produce a mercaptosilane surface modified clay for use in elastomers. A more preferred range of addition is between 0.25% and 0.45% silane based on the weight of the dry clay.

The hydrous clay is preferably a kaolin.

The invention also includes a method for reinforcing elastomers comprising the steps of modifying the surface of a hydrous clay with from about 0.2 to about 0.7% based on the weight of the dry clay, of a mercaptosilane of the formula:

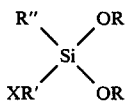

wherein R is alkyl, preferably a lower alkyl, e.g., $C_1$ to $C_4$, R' is $(CH_2)_3$, X is SH and R" is alkyl or aryl, and combining the thus surface modified clay with an elastomeric material.

DETAILED DESCRIPTION

In a typical procedure, a kaolin clay is mined and the crude is subjected to conventional beneficiation procedures, which may include such steps as magnetic separation and bleaching, and the kaolin is then flocculated and filtered. The filter cake is redispersed in water to form a 50% to 60% solids slurry and mixed with a silane of formula (2) shown above. The reaction is almost instantaneous. Then the slurry is spray dried to give the modified clay product.

A typical formulation with rubber comprises 75 parts by weight filler to 100 parts resin, plus modifiers, aids, and the like as shown in Formulation I. Trade names throughout are identified in Table 9.

| Formulation I | |
|---|---|
| Ingredient | Parts by weight |
| Natsyn 2200 | 100.0 |
| ZnO | 5.0 |
| Stearic acid | 2.0 |
| Agerite white | 1.0 |
| OBTS | 1.25 |
| TMTD | 0.2 |
| Sulfur | 2.75 |
| Silane treated clay | 75.0 |
| Total | 187.2 |

When rubber formulations such as these are subjected to conventional curing, the resultant products are found to have superior characteristics in comparison to products including prior art silane treated clay fillers—e.g., improved tear resistance, and improved stock-to-stock adhesion.

Extensive studies showed surprisingly superior properties for the products of the invention. In these studies, the silane employed was an alkyldimethoxy mercaptopropylsilane, e.g., methyldimethoxy mercaptopropylsilane, and it was used to treat hydrous kaolin clay. Typical physical properties of silane treated clays in accordance with the invention are given in Table 1. These products were prepared using silane treatment levels in the range 0.25 to 0.45% by weight of the dry clay.

TABLE 1

Mercaptosilane Treated Hydrous Clays
TYPICAL PROPERTIES

| PRODUCT DESIGNATION: | P1 | P2 | P3 | P4 | P5 |
|---|---|---|---|---|---|
| G.E. Brightness, % | 87–90 | 85–88 | 90–92 | 85–88 | 90–92 |
| Specific Gravity | 2.63 | 2.63 | 2.63 | 2.63 | 2.63 |
| Particle Size, in % less than 2 Micrometer | 80 | 92 | 95 | 92 | 95 |
| Particle Size, Avg. Micrometer | .40 | .25 | .20 | .25 | .20 |
| pH (3) | 7.0 | 7.0 | 7.0 | 7.0 | 7.0 |
| Screen Residue, % max. (325 mesh) (2) | .01 | .01 | .01 | .01 | .01 |
| Moisture, % max. (1 Hr. @ 105° C.) as packaged (1) | 1.0 | 1.0 | 1.0 | 1.0 | 1.0 |
| Bulk Density, lbs./cu. ft. | 50 | 50 | 50 | 50 | 50 |

(1) A STM D280
(2) A STM D1514
(3) Ph (±/−0.5) 100 g. clay; 250 ml water
The treated clays impart these properties to rubber compositions:
1. High modulus
2. Low Hysteresis
3. Improved Tear Resistance
4. Improved Stock-to-Stock Adhesion
5. Good Heat Aging Properties
6. Low Viscosity Levels (relative to loading)
7. Improved permeability resistance to Air, Gas, and Moisture These and other advantages of the invention will be illustrated by the following Examples, which, however, are to be considered illustrative and not delimitative of the invention otherwise set forth:

EXAMPLE I

This example is illustrative of use of the invention in passenger car tire white sidewall (WSW) portions of the tire body. The WSW-I formulation below was tested against similar formulations containing prior art products A and B which were treated in a similar process using trimethoxy mercaptopropylsilane instead of the silanes used in the present invention. The physical properties of these systems are provided in Table 2.

| WSW-I Formulation | |
|---|---|
| SMR-5 | 30.00 |
| EPDM | 10.00 |
| Chlorobutyl Rubber | 60.00 |
| Treated Clay | 40.00 |
| TiO$_2$ | 25.00 |
| ZnO | 5.00 |
| Wax | 5.00 |
| Stearic Acid | 1.00 |
| U-M Blue | 0.40 |
| Vultac 5 | 1.00 |
| MBTS | 0.75 |
| Sulfur | 0.50 |
| TOTAL | 148.65 |

TABLE 2

Silane Treated Clay P4 vs. Prior Art Product A
Silane Treated Clay P5 vs. Prior Art Product B

| Cured 20 min. @ 160° C. | A | P4 | B | P5 |
|---|---|---|---|---|
| 300% Modulus kg/sq. cm. | 45 | 39 | 39 | 46 |
| Tensile kg/sq. cm. | 116 | 140 | 130 | 138 |
| Elongation % | 550 | 600 | 650 | 600 |
| Hardness Shore A | 56 | 56 | 55 | 57 |
| Trouser Tear kg/cm. | 13.9 | 15.7 | 13.6 | 16.6 |
| Stock-to-Stock Adhesion kg/cm. | 3.2 | 4.1 | 3.2 | 5.4 |

In this high chlorobutyl rubber tri-blend composition, both treated clays P4 and P5 are compared with their respective prior art counterparts.

Both treated clays provide superior tear resistance and stock-to-stock adhesion with the P5 being the most effective. All testing procedures used in this and the following examples are ASTM as identified in Table 10.

EXAMPLE II

In this second Example of the WSW-II formulation, which is higher in natural rubber content, the P5 product is compared with the prior art B product.

| WSW-II Formulation | C | D |
|---|---|---|
| Vistalon 4608 | 20.00 | 20.00 |
| SMR-5 | 60.00 | 60.00 |
| HT 1066 | 20.00 | 20.00 |
| TiO$_2$ | 30.00 | 30.00 |
| Silane Treated Clay P5 | 40.00 | — |
| Prior Art B Product | — | 40.00 |
| Platey Talc | 20.00 | 20.00 |
| MgO | .50 | .50 |
| U-M Blue | .20 | .20 |
| Stearic Acid | 1.00 | 1.00 |
| ZnO | 5.00 | 5.00 |
| Insol. Sulfur | .67 | .67 |
| MBTS | .75 | .75 |
| Vultac 5 | 1.25 | 1.25 |
| TOTALS | 199.37 | 199.37 |

TABLE 3

| WSW-II Formulation Data | | |
|---|---|---|
| Cured 45 min. @ 149° C. | C | D |
| Modulus | | |
| 100% kg/sq. cm. | 25.3 | 20.4 |
| 200% kg/sq. cm. | 44.9 | 37.9 |
| 300% kg/sq. cm. | 63.3 | 55.5 |
| Tensile kg/sq. cm. | 135.0 | 128.0 |
| Elongation % | 530 | 550 |
| Trouser Tear | | |
| kg/cm. RT | 6.8 | 2.6 |
| kg/cm. 100° C. | 4.8 | 3.1 |

Composition C exhibits higher modulus with product P5 than Composition D with prior art B product which translates to improved buffing. Hot tear resistance is also superior by a significant margin.

The P5 product also has a high G.E. Brightness of 90-92 and can be considered as a partial replacement for TiO$_2$ in WSW and other color applications. The cost advantage of such a substitution is also attractive.

EXAMPLE III

Example III demonstrates the advantages of using one of the products of this invention in a tire innerliner. The formulation is given below:

| Innerliner Filler Ratios | | | |
|---|---|---|---|
| | F | G | H |
| HT1068 | 100 | 100 | 100 |
| N660 | 70 | 45 | — |
| N650 | — | — | 45 |
| Hard Clay | 24 | — | — |
| Silane Treated Clay P1 | — | 50 | 50 |

N660 and N650 are recognized trade carbon blacks used by the rubber industry in tire applications.

The control, composition F, uses a conventional mix of N660 (carbon black) blended with an untreated hard clay. Compositions G and H blend the silane treated product P1 with N660 and N650 carbon blacks respectively. The physical properties of the three compositions (F, G, H respectively) are given in Table 4 below.

The air permeability of compositions G and H show a significant increase in permeability resistance approaching the optimum that can be imparted by incorporating a reinforcing mineral pigment. This advantage in increased air permeability is due not only to the cross-linking ability imparted by the surface silane but also to the particle shape of the kaolin product: i.e., the P1 product is based on a delaminated kaolin.

TABLE 4

| Innerliner Test Data | | | | |
|---|---|---|---|---|
| Cured @ 145° C. | Min. | F | G | H |
| Modulus 300% kg/sq. cm. | 45' | 26.7 | 26.7 | 29.5 |
| Tensile kg/sq. cm. | 45' | 84.4 | 91.4 | 86.5 |
| Elongation % | 45' | 700 | 780 | 700 |
| Hardness Shore A | 45' | 55 | 55 | 55 |
| Scorch MS3 @ 121° C. | | 30 | 30 | 30 |
| Viscosity ML4 @ 100° C. | | 52 | 46 | 47 |
| Monsanto Flex Fatigue | 55' | | | |
| 1,000 cycles RT (room temp.) | | 50.1 | 34.9 | 29.1 |
| (70 Hr @ 100° C.) Aged | | 16.6 | 21.1 | 15.9 |
| Air Permeability | | | | |
| (1/sq. m/24 Hr/100 PA/0.075 cm.) | | 0.445 | 0.251 | 0.195 |

The stress-strain results are essentially equivalent, with aged flex equal to better for the compositions containing product P1.

The improved permeability resistance obtained through carbon black reduction and replacement with treated delaminated clay permits:

1. An improved innerliner compound at reduced cost.
2. A reduction in overall chlorobutyl rubber content—also a cost savings.
3. A possible gauge reduction (thickness) which would also reduce cost.

This improved permeability resistance can also offer advantages in systems such as fuel hose, Freon hose, and tank and pond liners.

EXAMPLE IV

The advent of single ply roofing membrane has allowed the use of silane treated clays in both white and black compositions. Example IV illustrates the use of these silane treated products of the invention in both compositions. The white EPDM roofing membrane formulation is given in Table 5 along with the physical property data.

The following white EPDM roofing study demonstrates the advantages of using products P1 or P3 as (1) a reinforcing filler, (2) to extend TiO2 (or partially replace TiO2 with these high GE brightness products), and (3) to provide resistance to "crimping" before installation. Where optimum permeability resistance or a higher loading is desired, product P1 would be preferred to product P3.

TABLE 5

| White EPDM Roofing Formulation | | |
|---|---|---|
| | I | J |
| Epsyn 5206 | 100.00 | 100.00 |
| Irganox 1035 | 1.00 | 1.00 |
| ZnO | 5.00 | 5.00 |
| Silane Treated Clay P1 | 100.00 | — |
| Silane Treated Clay P3 | — | 100.00 |

TABLE 5-continued

White EPDM Roofing Formulation

|  | I | J |
|---|---|---|
| TiO$_2$ | 25.00 | 25.00 |
| Napthenic Oil | 30.00 | 30.00 |
| Zn Stearate | 1.00 | 1.00 |
| MBTS | 0.75 | 0.75 |
| ZDBC | 0.75 | 0.75 |
| Sulfasan R | 1.25 | 1.25 |
| Sulfur | 0.75 | 0.75 |
| TOTAL | 265.50 | 265.50 |

White EPDM Roofing Data

| Cured 30 min. @ 160° C. |  | I | J |
|---|---|---|---|
| Modulus 100% kg/sq. cm. | Orig. | 28.2 | 21.1 |
|  | Aged | 59.1 | 47.8 |
|  | % Change | +52.4 | +55.9 |
| Modulus 300% kg/sq. cm. | Orig. | 44.4 | 43.0 |
|  | Aged | 78.7 | 88.6 |
|  | % Change | +42.8 | +51.6 |
| Tensile kg/sq. cm. | Orig. | 148.6 | 159.2 |
|  | Aged | 88.6 | 99.1 |
|  | % Change | −40.0 | −37.6 |
| Elongation % | Orig. | 740 | 750 |
|  | Aged | 440 | 420 |
|  | % Change | −40.5 | −44.0 |
| Hardness Shore A | Orig. | 65 | 63 |
|  | Aged | 80 | 78 |
|  | Change pts. | +15 | +15 |
| Fluid Immersion | % Wt. Change | +4.4 | +4.4 |

Aging Conditions: 28 days @ 100° C. in air circulating oven; 24 hour recovery.

Fluid Immersion Conditions: 168 hours @ 100° C. in distilled water with ½ hour recovery in 27° C. distilled water.

The market for EPDM single ply roofing continues to expand. Chemically modified clays can be used as a reinforcing filler in black roofing compositions to help reduce cost.

The black EPDM roofing formulation is given in Table 6. Tables 7 and 8 show the physical properties of the unaged and aged test samples respectively.

These data show that product P2 can be used to partially replace the carbon black content and meet all unaged and aged specifications.

TABLE 6

Black EPDM Roofing Formulation

| Royalene 502 | 100.00 |
|---|---|
| N660 | 85.00 |
| Silane Treated Clay P2 | 100.00 |
| Napthenic Oil | 95.00 |
| ZnO | 5.00 |
| Stearic Acid | 1.00 |
| MBT | 1.50 |
| TMTM | 2.00 |
| Sulfur | 1.00 |
| Diethylene Glycol | 0.50 |
| TOTAL | 391.00 |

TABLE 7

Black EPDM Roofing Data
Unaged Physical Properties

| Cured 20 min. @ 160° C. | Original | Specifications |
|---|---|---|
| Modulus |  |  |
| 100% kg/sq. cm. | 23.9 |  |
| 200% kg/sq. cm. | 52.7 |  |
| 300% kg/sq. cm. | 82.9 |  |
| Tensile kg/sq. cm. | 106.2 | 93.4 min. |

TABLE 7-continued

Black EPDM Roofing Data
Unaged Physical Properties

| Cured 20 min. @ 160° C. | Original | Specifications |
|---|---|---|
| Elongation % | 630 | 300 min. |
| Hardness Shore A | 62 | 60 to 70 |
| Viscosity ML4 @ 100° C. | 28.5 |  |
| Scorch MS3 @ 121° C. | 11.0 |  |
| Trouser Tear kg/cm. | 18.9 | 5.4 min. |

TABLE 8

Black EPDM Roofing Data
Aged Physical Properties

| Cured 20 min. @ 160° C. | Aged | % Change | Specifications |
|---|---|---|---|
| Modulus |  |  |  |
| 100% kg/sq. cm. | 26.7 | +10.5 |  |
| 200% kg/sq. cm. | 59.7 | +11.8 |  |
| 300% kg/sq. cm. | 91.4 | +9.2 |  |
| Tensile kg/sq. cm. | 101.2 | −4.6 | −28 max. |
| Elongation % | 560 | −11.1 | −25 max. |
| Hardness Shore A | 65 | +3 pts. |  |
| Fluid Immersion |  |  |  |
| % Vol. Change |  | +2.3 | +8 max. |
| % Wt. Change |  | +2.0 | +8 max. |
| Low Temp. Brittle Point Deg. °C. | −56 |  | −52 min. |
| Ozone Resistance |  |  |  |
| Day 1 | 0 |  | 0 cracking |
| Day 2 | 0 |  | 0 cracking |
| Day 3 | 0 |  | 0 cracking |
| Day 4 | 0 |  | 0 cracking |
| Day 5 | 0 |  | 0 cracking |
| Day 6 | 0 |  | 0 cracking |
| Day 7 | 0 |  | 0 cracking |

The aging conditions for the preceding test results are as follows:

Oven Aging: 7 days @ 70° C. in air circulating oven; 24 hour recovery.

Fluid Immersion: 166 hours @ 70° C. in distilled water; ½ hour recovery in distilled water @ 27° C.

Low Temperature Brittle Point: 5 specimens each tested in 100% Methanol cooling medium.

Ozone Resistance: Exposure 7 days @ 40° C. @ 100 pphm at 20% elongation; 24 hours prestretch @ 27° C.; rated every 24 hours.

Thus it can be seen that silane treated clays of the present invention have a higher safety factor with respect to tear and adhesion properties than can be achieved with prior art mineral filler products of another silane composition. They have the capability of partial replacement of carbon black. The novel products of this invention are the first low energy depending mineral fillers which provide rubber properties similar to those of carbon black.

TABLE 9

The following compounding ingredients are acknowledged as registered tradenames:

| Tradename | Source | Compositional Type |
|---|---|---|
| Natsyn 2200 | Goodyear | Polyisoprine Rubber |
| Vultac 5 | Pennwalt | Curing Agent |
| Vistalon 4608 | Exxon Chemicals Americas | EPDM Polymer |
| HT1066 | Exxon Chemicals Americas | Halogenated Butyl Rubber |
| Mistron Vapor | Cypress Industrial Minerals Co | Talc |
| Epsyn 5206 | CoPolymer Rubber | EPDM Polymer |
| Irganox 1035 | Ciba-Geigy | Curing Agent |
| Sulfasan R | Monsanto | Sulfur Donor Curing Agent |

TABLE 9-continued

The following compounding ingredients are acknowledged as registered tradenames:

| Tradename | Source | Compositional Type |
|---|---|---|
| Royalene 502 | Uniroyal Chemical | EPDM |
| Agerite White | R. T. Vanderbilt | Antioxidant |
| Nordel 1070 | DuPont | EPDM |
| Octamine | Uniroyal Chemical | Curing Agent |
| Hycar 1042 | B. F. Goodrich | Nitrile Rubber |
| Krynac 870/60 | Polysar | Nitrile PVC Rubber Blend |
| Wingstay 100 | Goodyear Chemicals | Antioxidant |
| Methyl Zimate | R. T. Vanderbilt | Curing Agent |
| SMR-S | | Standard Grade Natural Rubber |
| OBTS | | Thiobenzothiazole |
| TMTD | | Tetramethyl Thiuram Disulfide |

TABLE 10

| | |
|---|---|
| ASTM D3182 | Preparation of Materials |
| ASTM D412 | Physical Properties |
| ASTM D2240 | Hardness |
| ASTM D470 | Modified Trouser Tear |
| ASTM D1646 | Mooney Viscosity and Scorch |
| ASTM D623 | Heat Generation and Flex Fatigue |
| ASTM D945 | Compression Set |
| ASTM D573 | Oven Aging |
| Firestone Procedure for Ply to Ply Adhesion | |

While the present invention has been particularly described in terms of specific embodiments thereof, it will be understood in view of the instant disclosure, that numerous variations upon the invention will now be enabled to those skilled in the art, which variations yet reside within the scope of the present teachings. Accordingly, the invention is to be broadly construed, and limited only by the scope and spirit of the claims now appended hereto.

What is claimed is:

1. A finely divided particulate reinforcing filler pigment for elastomers comprising a hydrous clay, the surface of which has been modified by treatment with a mercaptosilane having the formula:

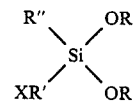

wherein R is alkyl, R' is $(CH_2)_3$, X is SH and R" is alkyl or aryl.

2. A filler pigment in accordance with claim 1, in which the clay used is a kaolin that has not been dehydroxylated.

3. A filler pigment as set forth in claim 2 in which from about 0.2% to about 0.7% of the silane is used based on the weight of the dry clay.

4. A filler pigment as set forth in claim 2 in which the silane is an alkyldimethoxy mercatopropylsilane.

5. A filler pigment as set forth in claim 4 in which the silane is methyldimethoxy mercaptopropylsilane.